3,245,808
HIGH STORAGE STABILITY MEAT CURING COMPOSITIONS

Charles R. Farkas, New York, Marc Vogel, Rego Park, and Irwin F. Levy, Brooklyn, N.Y., assignors to First Spice Mixing Company, Inc., Long Island City, N.Y., a corporation of New York
No Drawing. Filed June 21, 1963, Ser. No. 289,715
7 Claims. (Cl. 99—222)

This invention relates to meat curing compositions. More particularly, it is directed to meat curing compositions of markedly high stability during storage.

Meat curing compositions are based primarily on mixtures of alkali metal nitrites and alkali metal nitrates. These components are usually present in the form of their sodium salts. Additionally, they include sodium chloride and any or all of the following: sugar, such as cane sugar, corn sugar, dextrose and the like, and ascorbic acid or isoascorbic acid present either in racemic form or as the dextro or levo isomers (as free acids or in the form of suitable salts, usually the sodium salt), and flavor materials.

Such mixtures in dry form, particularly those consisting of the basic ingredients in combination with the ascorbic acid or isoascorbic acid or the salts thereof (hereinafter referred to as the "ascorbic component"), undergo decomposition on storage. Apparently, these compositions absorb atmospheric moisture in sufficient amount to effect interaction of the nitrite with the ascorbic component with resultant liberation of nitrous gases, i.e., nitrogen oxides, and resultant discoloration.

Various proposals have been advanced to prevent the above mentioned decomposition, none of which has been completely satisfactory.

Thus, one of the proposals is to include an alkali buffer in the mixture to prevent interaction between the ascorbic component and the nitrite. A disadvantage thereof resides in the fact that the curing process in meats takes place on the acid side. Indeed, meat per se has an acidic pH. Consequently, the addition of an alkali buffer reduces the curing potential and efficiency. A more recent proposal is that the nitrite and/or the ascorbic component primarily, which may also include the nitrate component, be coated with high melting point fats or partial fatty acid esters of polyhydric compounds. Thus, the proposal is to coat the crystals or granules with high melting fats such as tallow or hydrogenated vegetable oils which are solid at room temperatures and preferably up to 110 or 120° F. The high melting fatty films, accordingly, constitute barriers to water until the temperatures are elevated sufficiently to effect melting thereof. Consequently, when such curing mixtures are used during the preparation of emulsion products (frankfurters, bolognas, etc.), no curing takes place until these products are heat processed. The partial fatty acid esters of the polyhydroxy compounds, as for example, mono- and di-glycerides or Spans, disperse rather than dissolve in water. Consequently, the removal of such films when the meat curing compositions are made up into brines, is slow. Moreover, these are synthetic products and not naturally occurring food materials.

It has now been found that it is possible to provide meat curing mixtures in a form which is characterized by marked advantages and highly satisfactory stability.

Accordingly, it is among the principal objects of this invention to provide meat curing compositions which can be stored for long periods of time, in dry form, without undergoing decomposition due to air borne moisture.

In its fundamental aspects, this invention arises from the discovery that it is possible to coat one or more of the aforesaid reactive components of the meat curing compositions with a film, which, in effect, constitutes a barrier against chemical interaction. It has been found that if the nitrite and/or the ascorbic component be coated with a film or layer of a prolamin, such film constitutes a barrier of unique characteristics. A film or coating of a prolamin such as zein, gliadin, or hordein or the like, is not soluble in water. Accordingly, the film is a moisture resistant barrier. However, prolamins are soluble in aqueous solutions of sodium chloride. The prolamins are soluble in sodium chloride solutions whereof the sodium chloride concentration is as low as 0.9% (saline). Consequently, when a mixture of the basic components above mentioned (wherein some or all of the reactive ones are present as granules coated by a film of a prolamin) is made up into a curing brine, the barrier film readily dissolves and thus quickly forms the desired curing brine. Moreover, when meat curing mixtures containing sodium chloride are incorporated in the meat mass during the preparation of emulsion products, the solubility of the prolamin in the sodium chloride solution provides for dissolution of the prolamin coating even at the low temperature prevailing during such processing.

Accordingly, benefits of the present invention may advantageously be achieved by coating the granules of the ascorbic component or the nitrite with a prolamin. Such coating may be accomplished by spraying the granules with an acetone or alcohol-water solution of the prolamin. The prolamins are soluble, as is well known, in aqueous alcohols (70 to 80% ethanol). Consequently, those volatile solvents readily evaporate leaving the prolamin deposited as a film or coating on the granules.

A marked advantage of the prolamin coating resides in the resistivity thereof to air borne invasion which gives rise to notable improvement in stability and longer shelf life. Prolamin coatings, on contact with sodium chloride solutions, readily break and release the active components. Moreover, zein, either when dry or when present in organic solvent solutions, resists attack by the type of microorganisms that often cause other proteins to decompose. Consequently, zein will not spoil and give rise to unpleasant odors whether in storage or in use. Indeed, in the absence of water, it resists spoilage.

Furthermore, the use of the curing mixture in accordance with this invention does not render the pickle or brine any more alkaline than normal; and does not elevate the pH thereof. It has further been found, on stability tests, that an alkaline buffer curing mixture containing sodium ascorbate or sodium erythorbate exhibits a marked decrease in nitrite content as compared to corresponding mixtures whereof the ascorbic component is coated with a prolamine. Such difference was found on storage stability tests of three months under identical conditions.

There may also be included in the coating solution a lower glycol, as for example, propylene glycol, in partial or complete substitution of the water.

In carrying out the coating, a solution of the prolamin is prepared containing about 20–25%, by weight, of the prolamin in the aqueous ethanol (about 80–90% ethanol by volume).

The substance to be coated may be passed through a continuous mechanical mixer wherein it is sprayed with the coating soluiton, such as has just been described, at a constant rate.

The coating can also be carried out in a cylindrical chamber. In such case, the substance to be coated is fed into the chamber through a screen at the top thereof while the solution is sprayed on the falling particles through a spraying head. Warm air coming in from the bottom circulates upwardly and evaporates the solvent.

The following are examples in accordance with this invention:

Example 1

A coating solution is prepared by dissolving 25 grams of zein in a mixture of 85 ml. of ethanol (95%) and 15 ml. of water. Sodium nitrite crystals (mesh size, 40–60 U.S.) are coated with the above solution in a continuous mechanical mixer. A curing composition is then prepared of the following compositions:

| | Grams |
|---|---|
| Coated sodium nitrite | 6 |
| Sodium nitrate | 4 |
| Sodium ascorbate | 1 |
| Sodium chloride | 89 |
| | 100 |

This composition is characterized by marked stability during storage.

Example 2

A curing composition is made in accordance with the procedure described in Example 1, except that the coating solution consists of 25 grams of zein, 90 ml. of ethanol (95%) and propylene glycol, 10 ml.

Example 3

A curing composition is made as described in Example 1, except that the solution used to coat the sodium ascorbate or sodium erythorbate has the following composition:

| | | |
|---|---|---|
| Zein | grams | 25 |
| Ethanol | ml | 90 |
| Propylene glycol | ml | 5 |
| Water | ml | 5 |

Example 4

A curing mixture is prepared having the following composition:

| | Grams |
|---|---|
| Cane sugar | 16 |
| Dextrose | 4 |
| Zein coated potassium nitrite | 14 |
| Potassium nitrate | 10 |
| Zein coated sodium ascorbate | 18 |
| Sodium chloride | 1328 |

In this instance, both the potassium nitrite and the sodium ascorbate are coated with a prolamin film, e.g., zein.

Example 5

A curing composition is prepared as described in Example 1 with the addition of 1.5 grams of sugar.

Example 6

A curing composition is prepared as described in Example 1, except that 0.5 gram of sugar and 0.122 cc. of spices are included therewith.

Curing compositions corresponding to those of Examples 4–6 are prepared as described therein, except that sodium isoascorbate coated with zein is used as the ascorbic component.

Example 7

A curing mixture is prepared having the following composition:

| | Grams |
|---|---|
| Sodium chloride | 182 |
| Sodium nitrite | 8 |
| Sodium nitrate | 4 |
| Dextrose or cane sugar | 6 |

Either the sodium nitrite or the sodium nitrate is coated with a zein film.

The above examples are illustrative. The proportions of the components may be varied, as is well known in the art.

The thickness of the prolamin film depends on the concentration of the prolamin solution used for the coating operation, and the mechanical procedure employed. The stability of the curing composition also depends on the amount of the coated ingredients, especially the two critical ones, i.e., the ascorbic component and the nitrite component. If either one of these is coated, sufficient protection is achieved for many months. When, however, both of these components are coated, the storage stability can be extended for a markedly longer time.

It will be understood that the foregoing description of the invention and the examples set forth are merely illustrative of the principles thereof. Accordingly, the appended claims are to be construed as defining the invention within the full spirit and scope thereof.

We claim:

1. A meat curing composition consisting basically of a mixture, in proportions customarily present in meat curing compositions, of particles of:
    (1) an alkali metal nitrite,
    (2) an alkali metal nitrate, and
    (3) an ascorbic component,
wherein at least one of (1) and (3) is coated with a film of a prolamin.

2. A composition in accordance with claim 1 wherein the prolamin is zein.

3. A meat curing composition comprising the composition defined in claim 2 plus sodium chloride.

4. A meat curing composition in accordance with claim 3 including additional ingredients in proportions customarily present in meat curing compositions.

5. A composition in accordance with claim 1 wherein ingredient (1) is coated with zein.

6. A composition in accordance with claim 1 wherein ingredient (3) is coated with zein.

7. A composition in accordance with claim 1 wherein the ascorbic component is a member of the group consisting of ascorbic acid and isoascorbic acid and food grade salts of said acids.

References Cited by the Examiner

UNITED STATES PATENTS

| | | | |
|---|---|---|---|
| 2,054,625 | 9/1936 | Griffith | 99—222 |
| 2,117,478 | 5/1938 | Hall | 99—159 X |
| 2,475,133 | 7/1949 | Furter et al. | 99—169 X |
| 2,553,533 | 5/1951 | Komarik et al. | 99—159 |
| 2,828,212 | 3/1958 | Sair | 99—159 X |
| 3,052,560 | 9/1962 | Delaney | 99—159 X |

A. LOUIS MONACELL, *Primary Examiner.*

HYMAN LORD, *Examiner.*